(12) United States Patent
Marty et al.

(10) Patent No.: US 8,409,024 B2
(45) Date of Patent: Apr. 2, 2013

(54) TRAJECTORY DETECTION AND FEEDBACK SYSTEM FOR GOLF

(75) Inventors: Alan W. Marty, Menlo Park, CA (US); Thomas A. Edwards, Menlo Park, CA (US)

(73) Assignee: Pillar Vision, Inc., Menlo Park, CA (US)

( * ) Notice: Subject to any disclaimer, the term of this patent is extended or adjusted under 35 U.S.C. 154(b) by 1477 days.

(21) Appl. No.: 12/015,445

(22) Filed: Jan. 16, 2008

(65) Prior Publication Data

US 2008/0182685 A1 Jul. 31, 2008
US 2012/0238380 A9 Sep. 20, 2012

Related U.S. Application Data

(63) Continuation-in-part of application No. 11/508,004, filed on Aug. 21, 2006, now Pat. No. 7,854,669, which is a continuation-in-part of application No. 10/242,373, filed on Sep. 11, 2002, now Pat. No. 7,094,164.

(60) Provisional application No. 60/323,029, filed on Sep. 12, 2001, provisional application No. 60/348,057, filed on Jan. 11, 2002, provisional application No. 60/395,875, filed on Jul. 12, 2002, provisional application No. 60/880,773, filed on Jan. 16, 2007.

(51) Int. Cl.
*A63F 9/24* (2006.01)
*A63F 13/00* (2006.01)
*G06F 17/00* (2006.01)
*G06F 19/00* (2011.01)

(52) U.S. Cl. ........ 473/150; 473/156; 473/199; 473/409; 473/407; 356/28; 382/106; 700/91

(58) Field of Classification Search .................. None
See application file for complete search history.

(56) References Cited

U.S. PATENT DOCUMENTS 420,788 A 2/1890 Hart
4,160,942 A 7/1979 Lynch et al.
(Continued)

FOREIGN PATENT DOCUMENTS

EP 07074715 9/1995
FR 2 710 434 9/1993
(Continued)

OTHER PUBLICATIONS

Silverberg et al., "Numerical Analysis of the Basketball Shot," Journal of Dynamic Systems, Measurement and Control, Dec. 2003, vol. 125, pp. 531-540.

(Continued)

*Primary Examiner* — Paul A D'Agostino
(74) *Attorney, Agent, or Firm* — Kwan & Olynick LLP

(57) ABSTRACT

A system that captures, analyzes and provides feedback related to golf is described. The system is designed to capture and analyze an initial trajectory of a golf ball and predict a subsequent flight of the ball. The system may be configured to provide immediate feedback that may be utilized by a player to improve their performance as well as provide entertainment value above and beyond what is normally associated with the play of a game of golf. The analysis and feedback system may be portable and may be operable for use in an area where golf is normally played, such as a golf course or an area where golf training takes place, such as a driving range. In one example, the analysis and feedback system may be integrated into a golf bag. Further, the system may be designed to be non-intrusive such that a player may use the system and receive feedback during normal activities associated with golf, such as out on a golf course.

47 Claims, 8 Drawing Sheets

U.S. PATENT DOCUMENTS

| | | | | |
|---|---|---|---|---|
| 4,177,994 | A * | 12/1979 | Lindquist | 473/156 |
| 4,337,049 | A | 6/1982 | Connelly | |
| 4,545,576 | A | 10/1985 | Harris | |
| 4,565,527 | A | 1/1986 | Burchett | |
| 4,893,182 | A | 1/1990 | Gautraud et al. | |
| 5,039,977 | A | 8/1991 | Mele et al. | |
| 5,092,602 | A * | 3/1992 | Witler et al. | 473/199 |
| 5,138,322 | A | 8/1992 | Nuttall | |
| 5,210,603 | A | 5/1993 | Sabin | |
| 5,303,924 | A | 4/1994 | Kluttz et al. | |
| 5,342,041 | A | 8/1994 | Agulnek et al. | |
| 5,342,051 | A | 8/1994 | Rankin et al. | |
| 5,365,247 | A | 11/1994 | Van der Veen et al. | |
| 5,365,427 | A | 11/1994 | Soignet et al. | |
| 5,375,832 | A * | 12/1994 | Witler et al. | 473/199 |
| 5,398,936 | A | 3/1995 | Kluttz et al. | |
| 5,413,345 | A * | 5/1995 | Nauck | 473/156 |
| 5,471,383 | A * | 11/1995 | Gobush et al. | 700/91 |
| 5,489,099 | A | 2/1996 | Rankin et al. | |
| 5,489,886 | A | 2/1996 | Wexler et al. | |
| 5,542,988 | A | 8/1996 | Bogus | |
| 5,697,791 | A | 12/1997 | Nashner et al. | |
| 5,768,151 | A | 6/1998 | Lowy et al. | |
| 5,798,519 | A * | 8/1998 | Vock et al. | 250/206.1 |
| 5,868,578 | A | 2/1999 | Baum | |
| 5,879,246 | A * | 3/1999 | Gebhardt et al. | 473/409 |
| 5,938,545 | A * | 8/1999 | Cooper et al. | 473/407 |
| 6,093,923 | A | 7/2000 | Vock et al. | |
| 6,095,928 | A | 8/2000 | Goszyk | |
| 6,133,946 | A | 10/2000 | Cavallaro et al. | |
| 6,142,437 | A * | 11/2000 | Wilkins, Jr. | 248/231.71 |
| 6,179,720 | B1 | 1/2001 | Rankin et al. | |
| 6,285,445 | B1 * | 9/2001 | Winfield et al. | 356/28 |
| 6,289,167 | B1 | 9/2001 | Boetje et al. | |
| 6,304,665 | B1 * | 10/2001 | Cavallaro et al. | 382/106 |
| 6,320,173 | B1 * | 11/2001 | Vock et al. | 250/206.1 |
| 6,389,368 | B1 | 5/2002 | Hampton | |
| 6,396,041 | B1 | 5/2002 | Vock et al. | |
| 6,430,997 | B1 | 8/2002 | French et al. | |
| 6,488,591 | B1 * | 12/2002 | Gobush et al. | 473/199 |
| 6,500,073 | B1 * | 12/2002 | Gobush et al. | 473/199 |
| 6,514,081 | B1 * | 2/2003 | Mengoli | 434/252 |
| 6,520,864 | B1 * | 2/2003 | Wilk | 473/152 |
| 6,539,336 | B1 | 3/2003 | Vock et al. | |
| 6,567,116 | B1 | 5/2003 | Aman et al. | |
| 6,569,336 | B1 | 5/2003 | Mouchet et al. | |
| 6,669,571 | B1 * | 12/2003 | Cameron et al. | 473/131 |
| 6,707,487 | B1 | 3/2004 | Aman et al. | |
| 6,774,345 | B1 | 8/2004 | Kenk | |
| 6,774,349 | B2 | 8/2004 | Vock et al. | |
| 6,781,621 | B1 * | 8/2004 | Gobush et al. | 348/157 |
| 6,839,771 | B1 | 1/2005 | Bouchier et al. | |
| 7,094,164 | B2 | 8/2006 | Marty et al. | |
| 7,214,138 | B1 * | 5/2007 | Stivers et al. | 473/199 |
| 7,264,554 | B2 | 9/2007 | Bentley | |
| 7,899,307 | B1 | 3/2011 | Hughes | |
| 8,016,688 | B2 * | 9/2011 | Gobush | 473/131 |
| 8,083,617 | B2 * | 12/2011 | Greenquist et al. | 473/407 |
| 2001/0023209 | A1 * | 9/2001 | Yamamoto | 473/407 |
| 2002/0098898 | A1 * | 7/2002 | Manwaring | 473/151 |
| 2002/0119841 | A1 | 8/2002 | Foley | |
| 2002/0155896 | A1 * | 10/2002 | Gobush et al. | 473/197 |
| 2002/0173367 | A1 * | 11/2002 | Gobush et al. | 473/197 |
| 2003/0073518 | A1 * | 4/2003 | Marty et al. | 473/416 |
| 2003/0109322 | A1 | 6/2003 | Funk et al. | |
| 2005/0012023 | A1 | 1/2005 | Vock et al. | |
| 2005/0215338 | A1 | 9/2005 | Miyamoto | |
| 2005/0223799 | A1 | 10/2005 | Murphy | |
| 2007/0026974 | A1 | 2/2007 | Marty et al. | |
| 2007/0026975 | A1 | 2/2007 | Marty et al. | |
| 2007/0129180 | A1 | 6/2007 | Levy | |
| 2007/0167247 | A1 | 7/2007 | Lindsay | |
| 2008/0015061 | A1 | 1/2008 | Klein | |

FOREIGN PATENT DOCUMENTS

| | | |
|---|---|---|
| WO | WO 98/24242 | 6/1998 |
| WO | WO 01/38898 | 5/2001 |
| WO | WO 01/54781 | 8/2001 |

OTHER PUBLICATIONS

Tran, "Optimal release conditions for the free throw in men's basketball," Journal of Sports Sciences, Sep. 2008; 26(11): 1147-1155.

Okubo et al., "Dynamics of basketball-rim interactions," Sports Engineering, (2004) 7, pp. 15-29.

Okubo et al., "Effects of basketball free throw release conditions using a dynamic model," The Engineering of Sport 5, vol. 1, 372-378, Central Plain Book Mfg., 2004.

Okubo et al., "Dynamics of basketball-rim interactions," The Engineering of Sport: 4, Blackwell Science, Oxford, 2002, pp. 660-666.

Okubo et al., "Strategies for Bank Shots and Direct Shots in Basketball," The Engineering of Sport: 6, vol. 3, Springer, New York, 2006, pp. 233-248.

Okubo et al., "Dynamics of the basketball shot with application to the free throw," Journal of Sports Sciences, Dec. 2006; 24(12): 1303-1314.

Notice of Allowance and Allowed claims mailed Apr. 5, 2006 from related U.S. Appl. No. 10/242,373, 21 pgs.

Hawk-Eye—Wikipedia, the free encyclopedia http://en.wikipedia.org/wiki/Hawk-Eye printed Jan. 10, 2008 pp. 1-4.

U.S. Office Action dated Aug. 4, 2010 from U.S. Appl. No. 11/508,004.

U.S. Office Action dated Jun. 10, 2010 from U.S. Appl. No. 11/507,886.

U.S. Office Action dated Oct. 3, 2011 from U.S. Appl. No. 11/972,553.

U.S. Office Action dated Jan. 11, 2012 from U.S. Appl. No. 12/127,744.

U.S. Final Office Action dated Mar. 21, 2012 from U.S. Appl. No. 12/127,744.

* cited by examiner

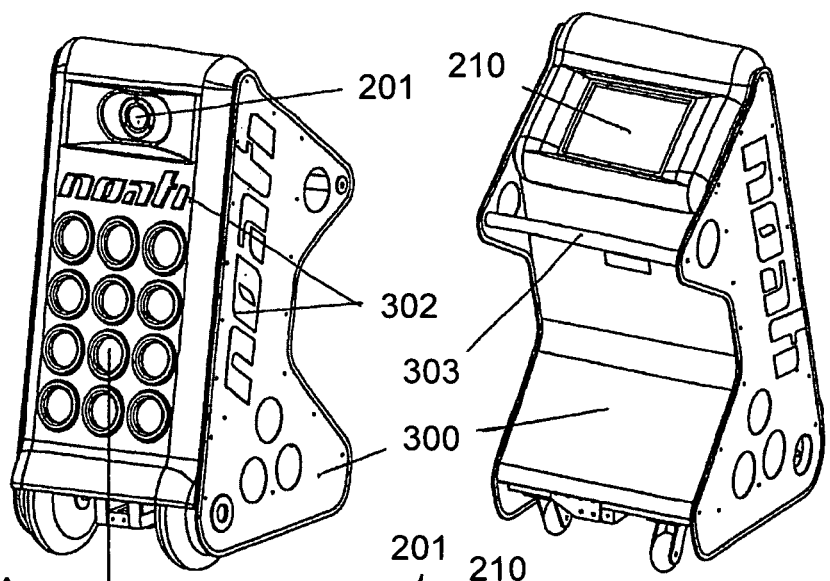
Figure 7A
Figure 7B
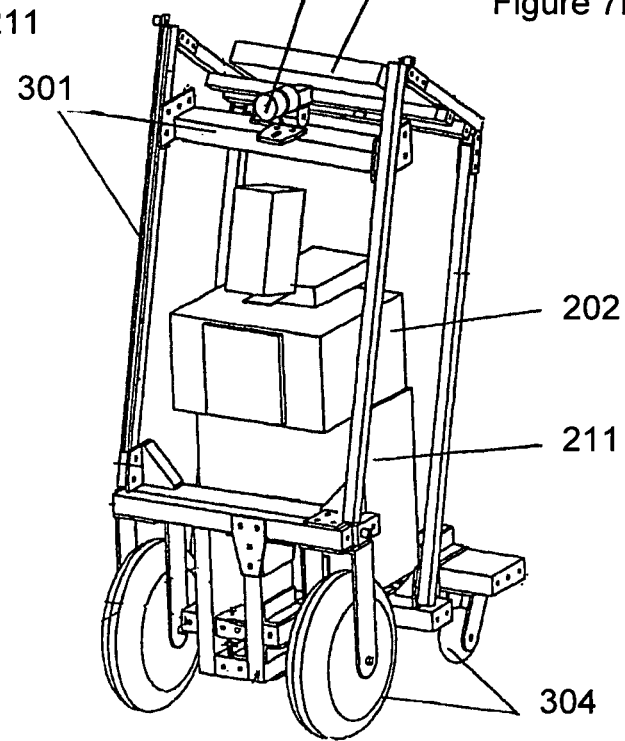
Figure 7C

TRAJECTORY DETECTION AND FEEDBACK SYSTEM FOR GOLF

RELATED APPLICATION DATA

This application claims priority to U.S. Provisional Patent Application No. 60/880,773, filed on Jan. 16, 2007, entitled "Trajectory Detection and Feedback System for Golf," which is incorporated herein by reference in its entirety and for all purposes. This application is also a Continuation-in-Part application of prior-filed U.S. application Ser. No. 11/508,004, filed Aug. 21, 2006, now U.S. Pat. No. 7,854,669, which is a Continuation-in-Part and claimed priority under 35 U.S.C. §120 to U.S. application Ser. No. 10/242,373, filed Sep. 11, 2002, now U.S. Pat. No. 7,094,164, which claimed priority under 35 U.S.C. §119(e) from U.S. Provisional Patent Application No. 60/323,029, filed Sep. 12, 2001, from U.S. Provisional Patent Application No. 60/348,057, filed Jan. 11, 2002, and from U.S. Provisional Patent Application No. 60/395,875 filed Jul. 12, 2002.

This application is related to U.S. application Ser. Nos. 11/507,886 and 11/508,004, both filed Aug. 21, 2006 and both titled, "TRAJECTORY DETECTION AND FEEDBACK SYSTEM," each of which is incorporated herein in their entirety and for all purposes.

This application is related to U.S. application Ser. No. 11/972,553, by Marty, et al., filed Jan. 10, 2008, titled "Trajectory Detection and Feedback System for Tennis," which is incorporated herein by reference in its entirety and for all purposes.

TECHNICAL FIELD

The present invention relates generally to devices and systems for sports training and entertainment and more specifically to a trajectory detection and feed back systems and associated methods for golf.

BACKGROUND

There is an on-going interest in providing training methods that allow golfers, both professional players and casual players to improve their game. Currently, simple, non-intrusive, cost effective ways don't exist that allow golfers to train muscle memory for trajectory at the driving range or while playing a round on the course. In particular, to enable confident club selection/shot execution for a needed distance on the course, it is desirable to provide golfers with method and apparatus 1) to train muscle memory for trajectory across a series of clubs, 2) to know whether the range training for trajectory is being correctly reproduced while on the golf course, 3) to measure muscle memory consistency in their swing when ball results are impacted by in-situ environmental conditions, and 4) to make training/practice more entertaining. Methods and apparatus designed or configured to meet these desires are described as follows.

SUMMARY

A system that captures, analyzes and provides feedback related to golf is described. The system may be designed to capture and analyze an initial trajectory of a golf ball and predict a subsequent flight of the ball. The system may be configured to provide immediate feedback that may be utilized by a player to improve their performance as well as provide entertainment value above and beyond what is normally associated with the play of a game of golf. The analysis and feedback system may be portable and usable outdoors. For instance, the analysis and feedback system may be operable for use on a golf course or a driving range.

One aspect of the invention relates to a device for analyzing a trajectory of a golf ball. The device may be generally characterized as comprising: 1) one or more cameras for recording video frame data used to determine at least initial conditions for predicting a trajectory of a golf ball where only an initial portion of the golf ball's trajectory is captured in the video frame data for the purposes of predicting the trajectory and where the predicted trajectory comprises at least impact with a club to a location where the golf ball is predicted to land; 2) a logic device designed or configured to i) receive the video frame data, ii) identify the golf ball in the video frame data, iii) predict the trajectory of the golf ball accounting for a spin of the golf ball where the trajectory predictions include generating trajectory parameters that characterize one or more states of the golf ball between at least the impact with the club and the location where the golf ball is predicted to land and iv) generate feedback information using the trajectory parameters; and 3) at least one output mechanism for providing the feedback information wherein the device is portable and designed for use outdoors. The device may include two cameras or a stereoscopic camera. One or more portions of the device may be water-resistance or waterproof. Further, the device may be integrated into a golf club bag which may include wheels. The device may be for use on a golf course or on a driving range.

In particular embodiments, the logic device is further designed or configured 1) to identify a body element of a person swinging the club, 2) to determine a position of the body element, an orientation of the body element, a velocity of the body element or combinations thereof, as a function of time and provide feedback information related to one or more of the position of the body element, the orientation of the body element or the velocity of the body element, 3) to incorporate the position of the body element, the orientation of the body element, the velocity of the body element or combinations thereof, as the function of time into an animated model or combinations thereof. The animated model may be a 3-D skeletal model.

In particular embodiments, the logic device is further designed or configured to 1) identify the club in the video frame data, 2) determine a position of the club, a velocity of at least one point on the club, an orientation of the club or combinations thereof as a function of time wherein the at least one point on the club may be located on a club head or a clubface, 3) to incorporate the position of the club, the velocity of at least one point on the club, the orientation of the club or combinations thereof as the function of time into an animated model or combinations thereof.

In yet other embodiments, the device may comprise one or more sensors for determining an orientation of the device where the one or more sensors comprise accelerometers or tilt sensors. The output mechanism may be a wireless interface for outputting the feedback information to one or more remote devices where the remote device may be worn by the player. Further, the output mechanism may be an audio device coupled to the display.

In particular embodiments, the device may further comprise: a housing, for the one or more cameras, the logic device, and the at least one output mechanism, the housing having a weight and form factor which facilitate one or more of transport, storage, unobtrusive set-up, calibration, or operation of the device. The device may further comprise an input mechanism where the input mechanism is a touch screen display. The input mechanism may be a wireless interface for receiving input from a remote device. The device may further comprise a GPS receiver for determining a location of the device. The logic device may be is a general purpose computer comprising: a processor, a data storage device, RAM, operating system software, device interfaces, device drivers and trajectory analysis software.

In other embodiments, the device may be capable of one of autonomous set-up, autonomous calibration, autonomous operation or combinations thereof. After manual input of data by a user, a confirmation of data determined by the device, the logic device is further designed or configured to complete a calibration procedure.

The device may comprise a memory storage device for storing trajectory session information wherein the trajectory session information comprises one or more of 1) digitized video frame data, trajectory information and feedback information generated for a plurality of trajectories, 2) a trajectory session time, 3) a trajectory session date, 4) a trajectory session location and combinations thereof. The device may be designed to determine for a plurality of related trajectories captured by the device a consistency for at least one of the trajectory parameters generated for each of the plurality of related trajectories where the consistency is determined by calculating a statistical deviation. The device of may include: a database of club characteristics for use in the trajectory predictions. The club characteristics include club geometry parameters, club material properties and club mass properties.

The logic device is further designed or configured to predict a trajectory after the location where the golf ball is predicted to land where a final portion of the golf ball's trajectory includes a prediction of one or more bounces or rolls by the golf ball. The logic device may be further designed or configured to account for a change in elevation between a location where the golf ball is hit to the location to the golf ball is predicted to land in determining where the golf ball is predicted to land.

The feedback information may be related to one or more of the following: 1) a predicted straight-line distance of the shot, 2) a measured straight-line distance of the shot based, 3) a predicted height of the shot, 4) a measured height of the shot, 5) a predicted landing speed of the shot, 6) the location where the shot is predicted to land, 7) a predicted direction vector of the shot, 8) a measured landing speed of the shot, 9) a measured landing location of the shot, 10) a measured direction vector of the shot, 11) a parameter quantifying trajectory consistency of a plurality of shots with an identical club, 12) a parameter quantifying trajectory spacing of a series of clubs, 13) a measured initial speed of the shot, 14) a measured initial angle of the shot, 15) a measured initial spin of the shot, 16) a measured initial direction vector of the shot, 17) a predicted time aloft, 18) a measured time aloft, 19) a predicted quantification of the amount of draw of the shot, 20) a measured quantification of the amount of the draw of the shot, 21) a predicted quantification of an amount of fade, 22) a measured quantification of an amount of fade, 23) a predicted distance traveled along trajectory of the golf ball, 24) a predicted distance traveled along the ground track of ball, 25) a predicted distance traveled along a line between the shot starting point and a another position, 26) a predicted initial distance from a pin prior to shot minus a final distance from the pin after the shot, 27) a measured initial distance from the pin prior to the shot minus the final distance from the pin after the shot, 28) a predicted distance accounting for a surface with which the golf ball makes contact including one or more of a fairway surface, a green surface, a rough surface, a water surface, a sand surface, a tree surface or combinations thereof, 29) a predicted club head speed at the impact with golf ball, 30) a measured club head speed at the impact with the golf ball, 31) a length of time of a backswing, 32) a length of time of a forward swing or 33) combinations thereof.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media.

Aspects of the invention may be implemented by networked gaming machines, game servers and other such devices. These and other features and benefits of aspects of the invention will be described in more detail below with reference to the associated drawings. In addition, other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods for providing game services to remote clients. These drawings in no way limit any changes in form and detail that may be made to the invention by one skilled in the art without departing from the spirit and scope of the invention.

FIGS. 7A-7C are perspective drawings illustrating exemplary components of a trajectory detection and analysis system.

DETAILED DESCRIPTION

In the following figures, aspects of a system that captures, analyzes and provides feedback related to golf is described. In particular, the system may be designed to capture and analyze an initial trajectory of a golf ball and predict a subsequent flight of the ball. The system may be configured to provide immediate feedback that may be utilized by a player to improve their performance as well as provide entertainment value above and beyond what is normally associated with the play of a game of golf. The analysis and feedback system may be portable and may be operable for use in an area where golf is normally played, such as a golf course or an area where golf training takes place, such as a driving range. In one example, the analysis and feedback system may be integrated into a golf bag. Further, the system may be designed to be non-intrusive such that a player may use the system and receive feedback during normal activities associated with golf.

Figure 3:
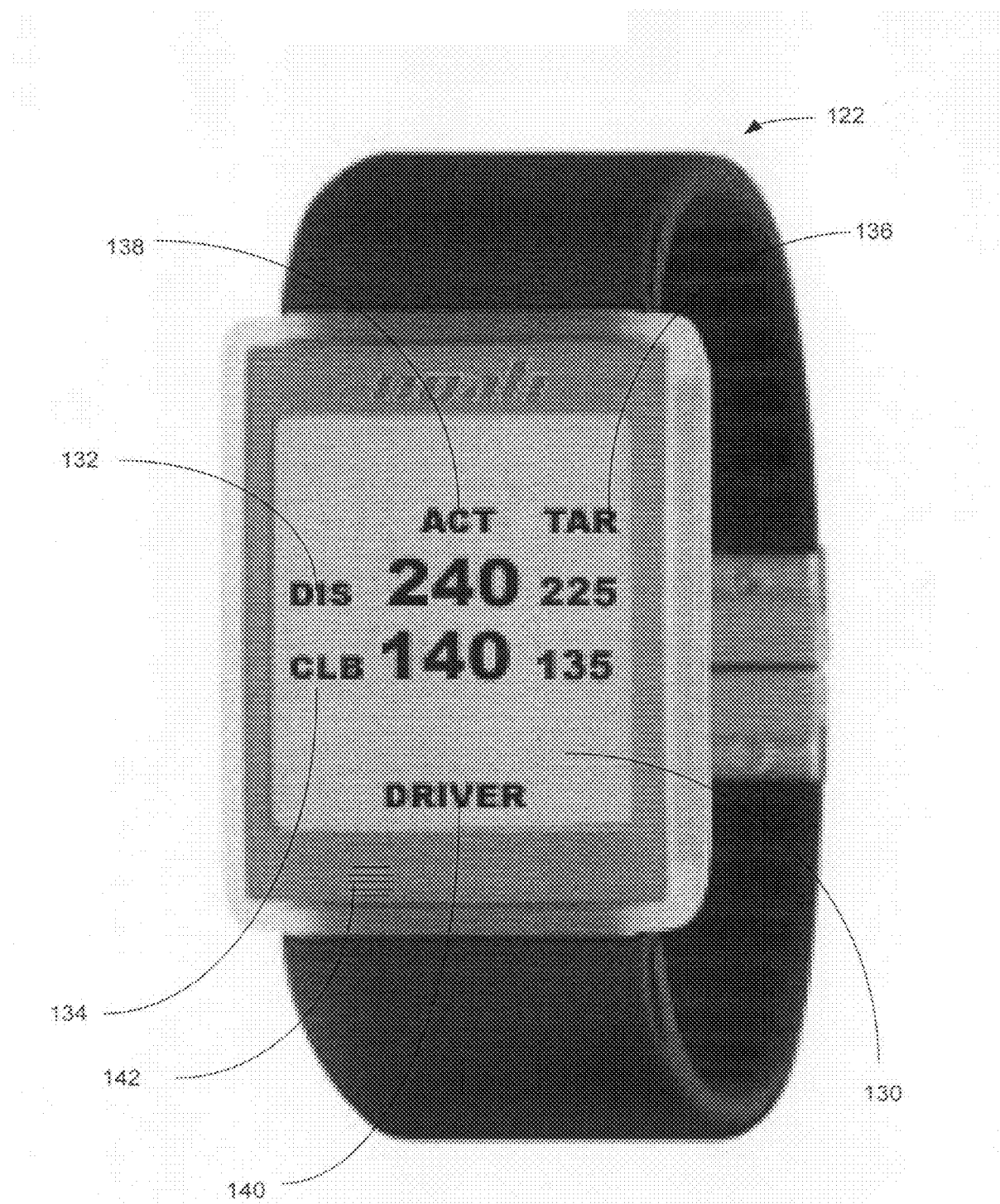
FIG. 3 is an example of a wearable feedback interface for a trajectory detection and analysis system for golf.
Figure 4:
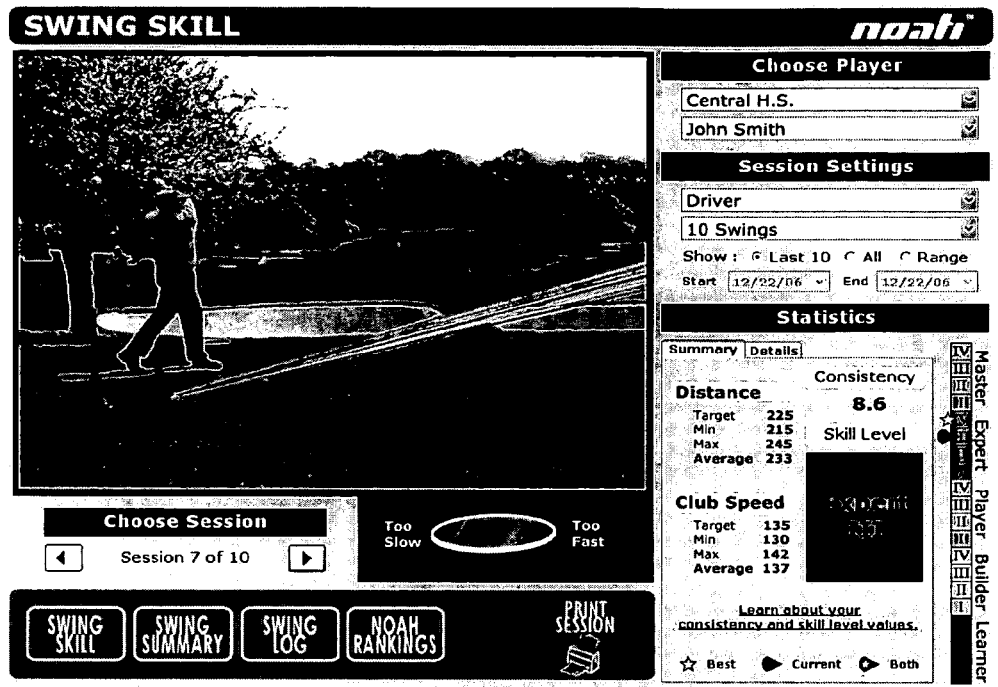
FIGS. 4 and 5 are examples of interface screens for a trajectory detection and analysis system for golf.
Figure 5:
Figure 6:
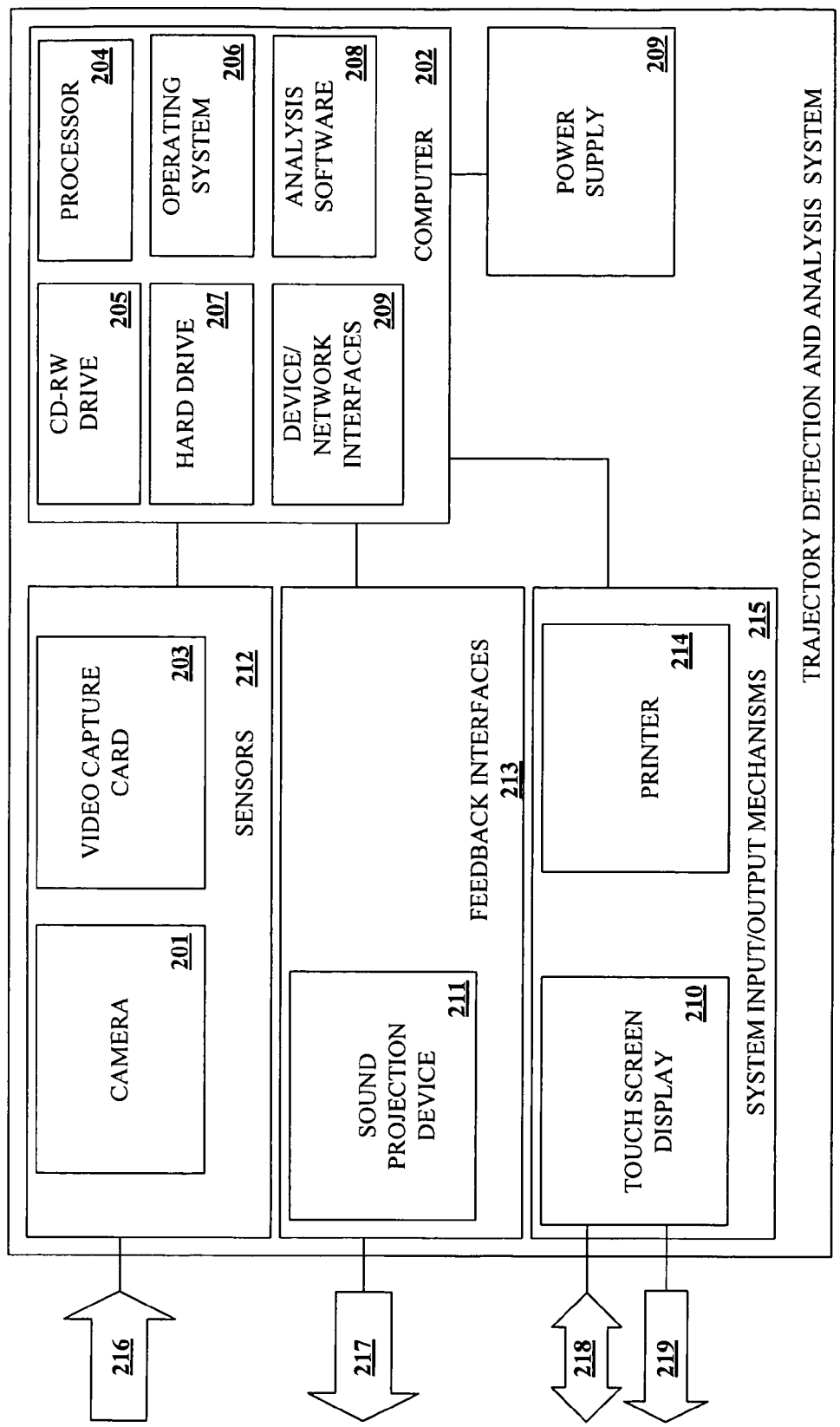
FIG. 6 is a block diagram illustrating exemplary components of a trajectory detection and analysis system.
Figure 8:
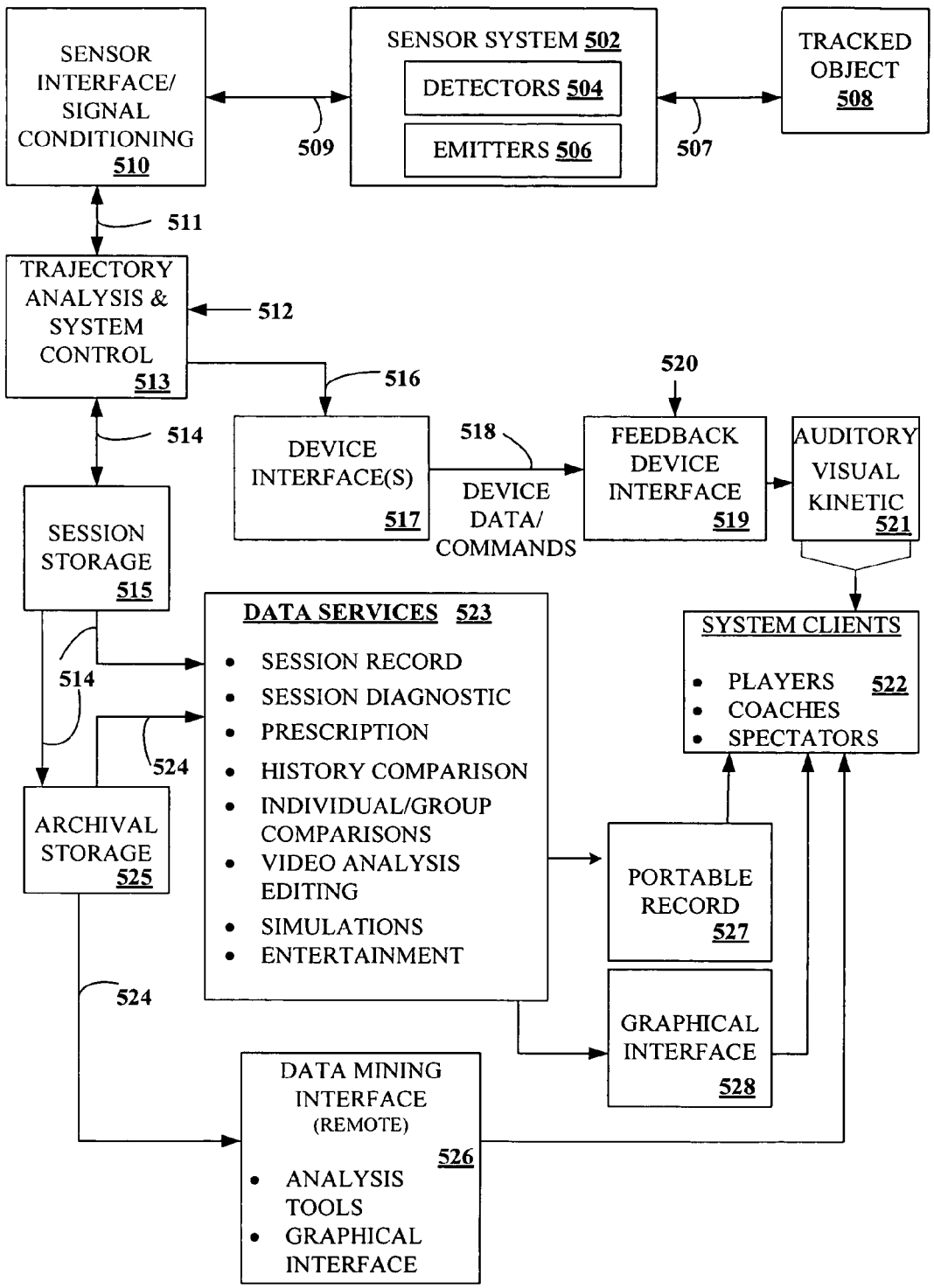
FIG. 8 is an information flow diagram for exemplary components of a trajectory detection and analysis system.

Devices, system and methods for analyzing a trajectory of a golf ball are described in the following figures. The trajectory analysis system and associated methods may be utilized for the purposes of both training and entertainment. As an example, in FIGS. 1, 2A and 2B an analysis and feedback device, which may be portable and designed to operate on a golf course to provide in-situ trajectory measurements and real-time feedback, is shown. In FIG. 3, a wearable feedback interface device with a few examples of feedback related to swing mechanics is shown. In FIGS. 4 and 5 analysis screens associated with trajectory measurements are shown. A discussion of exemplary components of a trajectory and analysis feedback system, which are illustrated in FIGS. 6-8, are provided. An embodiment of a calculation method for determining a flight path of a golf ball is discussed with respect to FIG. 9.

Figure 1:
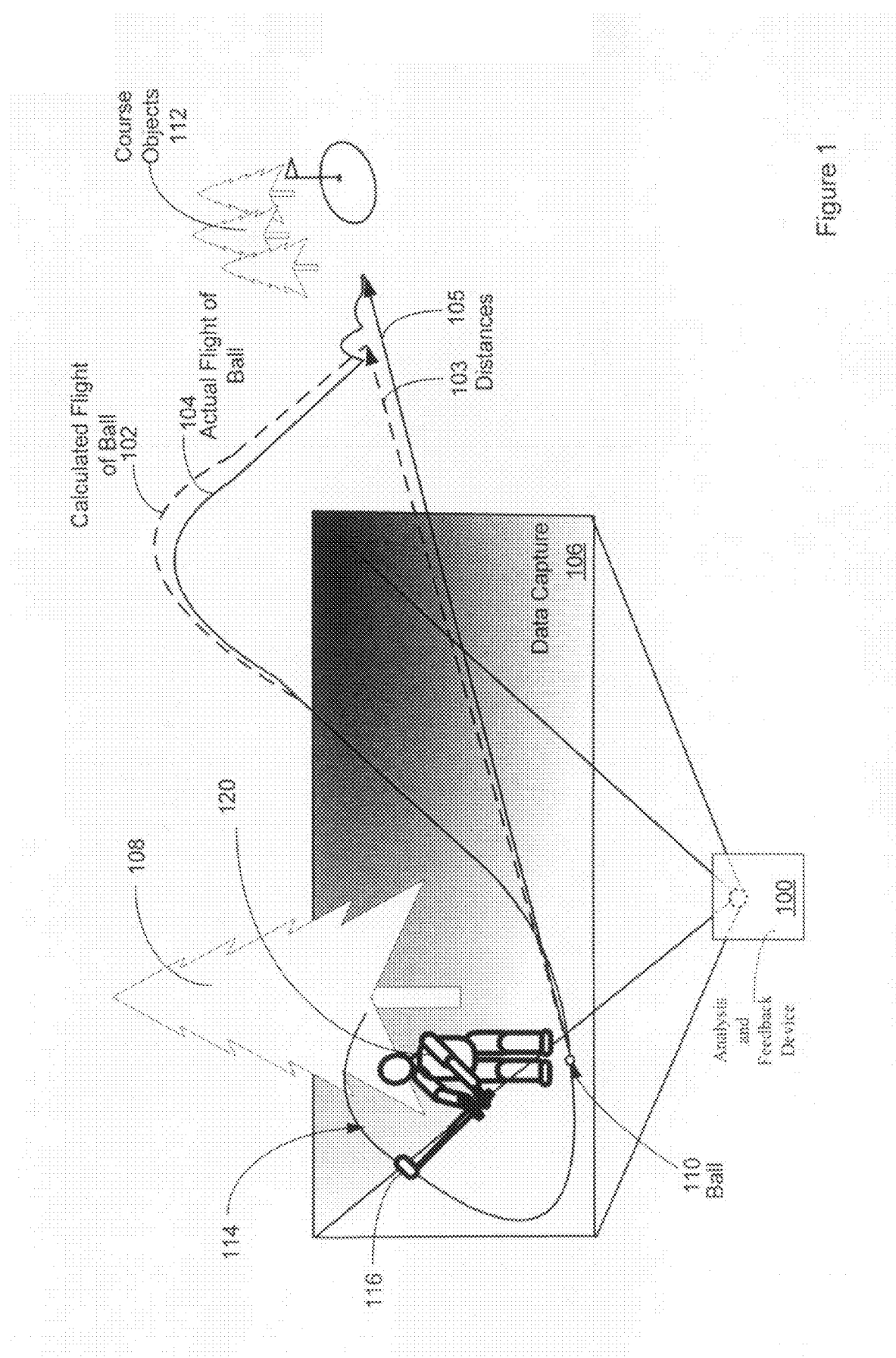
FIG. 1 is a diagram illustrating an in-situ use of trajectory detection and analysis system for golf.

FIG. 1 is a diagram illustrating an in-situ use of trajectory detection and analysis system for golf. The device/system 100 may comprise one or more of the following, 1) one or more cameras (or 3D capturing sensors, such as CanestaVision™ Camera Module, Canesta, Inc., Americas Headquarters, Sunnyvale, Calif.) for recording video frame data used to characterize a trajectory of a golf ball 110 hit by a club 116 swung by a user 120; 2) a logic device designed or configured to i) receive the video frame data 106, ii) generate trajectory parameters that characterize one or more states of the golf ball along its trajectory 102 and iii) generate feedback information using the trajectory parameters; 3) one or more feedback output mechanisms for providing the feedback information to the user as output mechanisms that are operable to output feedback information in video and/or audio formats (e.g., see 122 in FIGS. 2A and 3), 4) one or more devices for measuring ambient conditions, 5) a location device, such as a GPS receiver, 6) a communication interface for communicating with one or more remote devices and 7) accelerometer(s) or other sensors for detecting and/or recording a motion associate with a golfer, a motion associated with a golf club, a motion associated with a camera and/or a motion associated with the device 100.

Further the device may include a rechargeable or replaceable energy source to power the camera(s), logic device, and/or output signal. This rechargeable or replaceable energy source may be one or more of the following: a battery, a solar panel, a fuel cell or combinations thereof. Further details of apparatus and methodology that may be utilized are described with respect to FIGS. 2A-9 as well as with respect to U.S. patent application Ser. No. 11/508,004, entitled, "Trajectory Analysis and Feedback System," by Marty, et al, filed Aug. 21, 2006, which are incorporated herein by reference and for all purposes.

In FIG. 1, a club head trajectory 114, course objects 108 and 112, a calculated trajectory of ball 102 and actual flight of ball 104, a calculated and actual distance of a golf trajectory are shown. Additional details regarding trajectory calculations are provided with respect to FIG. 9. The trajectory calculations may be used to provide feedback information to user 120. The feedback information may be related to one or more of the trajectory parameters: 1) a calculated straight-line distance of a shot (from shot location to landing location), 2) actual straight-line distance of a shot, 3) calculated height of a shot, 4) actual height of a shot, 5) calculated landing speed, location and/or direction vector of a shot, 6) actual landing speed, location, and/or direction vector of a shot, 7) a parameter quantifying trajectory consistency of a shot with the same club, 8) a parameter quantifying trajectory spacing of a series of clubs, 9) initial speed, angle, spin and/or direction of a shot, 10) a time aloft, 11) a quantification of an amount of draw, 12) a quantification of an amount of fade, 13) a distance traveled along trajectory of the ball, 14) a distance traveled along ground track of ball, 15) a distance traveled along a line between the shot starting point and a position, such as hole position, 16) a calculated or actual initial distance from pin prior to shot minus final distance from pin after shot, 17) a calculated or actual distance accounting for the surface with which the ball makes contact including fairway, green, rough, water, sand, tree branches, etc., 18) a calculated or actual angle as the ball leaves the ground or tee and 19) a calculated or actual velocity as the ball leaves the ground or tee.

The analysis and feedback device may also be operable to measure and provide feedback on other golf swing parameters associated with the shot. Further, the device may be operable to measure and provide feedback on consistency of these parameters with the same club and across a series of clubs. The feedback information that is provided may be related to one or more of the following: 1) a club head, a portion of the club head (or other part of the club) trajectory parameter at different points along its trajectory (e.g., speed and/or position at different times, amount of time for back swing), 2) a hand (or wrist) movement, 3) a hip movement (lateral, vertical, rotational), 4) a shoulder movement (lateral, vertical, rotational), 5) a head (person) movement, 6) an arm movement, 7) a leg movement, 8) a movement or speed of one body part relative to another body part or relative to point on the club (the feedback may utilize or may provide a 3D skeletal model of body parts with club), 12) an estimated force or torque generated during the swing, etc or a 13) biophysical property, such as breathing rate or heart rate. The device may be operable to analyze the golf swing parameters associated with the golf club and player biomechanics as they relate to any results determined for the ball trajectory and provide appropriate feedback information. For example, if the speed of a player's back swing trajectory 114 is variable from shot to shot such that back swing speeds that leads to good shots or bad shots may be determined after the results of a series of shots, then the device may provide feedback information, such as "back swing too slow" or "back swing too fast."

In other embodiments, the device 100 may be operable to store the trajectory parameters or golf swing parameters for later review, upload, analysis, display and sharing. Further, the device may be operable to provide a video recording of the swing(s) for immediate or delayed review, analysis or sharing. In addition, the analysis and feedback device or an associated device may be operable to integrate data from different sources. For example, a video recording of the swing may be integrated with a plot of the trajectory of the resulting shot.

In a particular embodiment, stored data recorded for a player may be utilized to generate a video simulation, such as a video game simulate of the player playing golf. After playing a round of golf or during a round of golf, data generated and stored by device 100 may be uploaded via a network or transfer to another storage media for incorporation into a video golf simulation. The video golf simulation might include a recreation of the player's round of golf including each of their shots where portions of the data generated by device 100 may be utilized in the modeling used to generate the video golf simulation.

As an example, the video golf simulation might allow the player to look at 3-D animated model of a person emulating their swing parameters. The video golf simulation may allow the user to look at their swing from various angles. Further, the video golf simulation may be operable to point out flaws or areas where the player may improve their golf swing.

In another example, a series of shots generated by a player and captured by device 100 may be utilized to populate a database. The database may be used as a basis for a video game where one player competes against another player in a game of golf where the outcome of the golf game is affected by shots selected from the database. For instance, a player may select a club for a stroke in the video game and then take the shot using the selected club, the outcome of the simulated shot may be influenced by an actual shot previously made by the player using the selected club that is stored in the database. Thus, a better golfer with a better database of shots may perform better in the simulated video golf game.

In consumer products, ease of use is always an important concern. To simplify its use, the analysis and feedback device 100 may be operable to measure a number of variables for at least the purposes of self-calibration. For instance, the device may be operable to sense one or more of the following: its own position, the position of the ball, the position of the ball and device relative to each other, the position of the golfer relative to the ball, the position of the golfer relative to the device. In addition, the device may be to self-calibrate accounting for one or more of the following parameters: ball position, golfer position, device position, slope of land, tilt of device, lighting, wind, humidity, type of club, brand of club, type of ball, identity of golfer, altitude. The device may also be operable to allow manual entry of one or more these parameters.

For purposes of training and/or entertainment, the analysis and feedback device may measure and/or generate one or more parameter(s) that are compiled into a score(s), allowing the player to track and share improvement in score. In some instances, the scores may be shared in a real time or delayed fashion over a medium, such as the Internet, allowing players to compete with each other. In some instances, these scores may be provided to an audience or other players in engaged in a competition with the player.

Figure 2B:
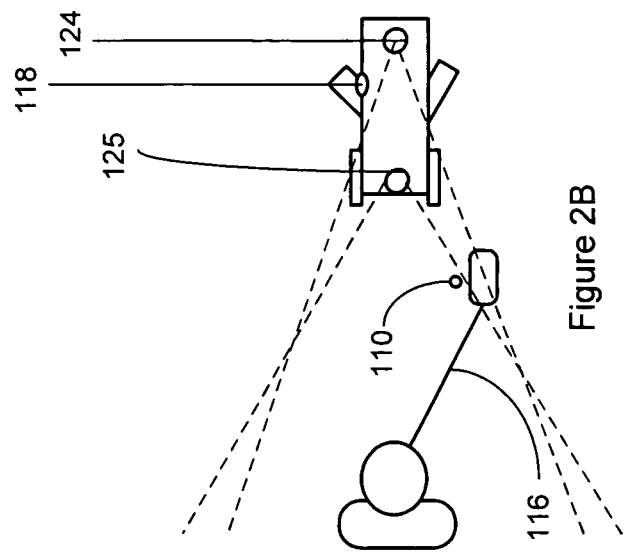
FIGS. 2A and 2B are a side perspective view and a top perspective view illustrating a use of a trajectory detection and analysis system for golf that is integrated in a golf club bag.
Figure 2A:
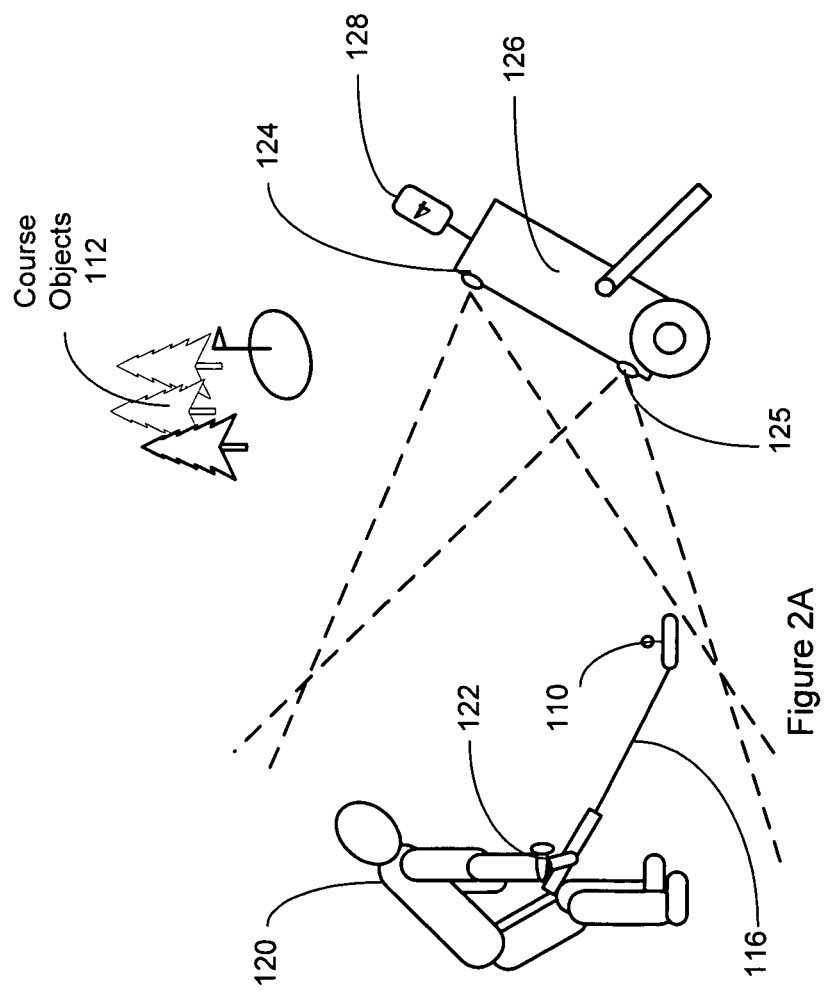

FIGS. 2A and 2B are a side perspective view and a top perspective view illustrating a use of a trajectory detection and analysis system for golf that is integrated in a golf club bag configured to carry golf clubs, such as 128. In FIGS. 2A and 2B, a custom golf bag 126 containing a stereo camera consisting of top camera 124 and bottom camera 125 may be utilized. In other embodiments, a single camera may be utilized. The bag 126 may also contain a logic device (not shown) that receives frames captured from the cameras 124 and 125, generates the trajectory information and generates a wireless signal with initial ball speed and angle. The wireless signal may be received by a custom watch 122 or other wearable or portable device, which displays club type, ball speed and ball angle immediately after the shot, such as within a few seconds The watch 122 or other wearable device may be operable to store a series of shots, including video frame data and/or analysis data, that may later be downloaded to a computer or may be uploaded onto the Internet, if desired. This information may be also stored by the analysis and feedback device, which may have data transfer capabilities. Golf club 116 and golf ball 110 may be unmodified. An advantage of this approach is that a player may use standard equipment in a native environment (i.e., on the actual golf course).

In one possible set-up, a player may place the golf bag including the analysis and feedback device proximately perpendicular to the direction the ball will be hit and 5' to 15' away from the ball. As described above, the analysis and feedback device may include self-calibration capabilities, such as determining its distance from the ball. A player may select a club and sweep the club number (or as another example, a club cover) in front of the lower camera so the club type is identified. Identification may involve optical character recognition of visible or infrared markings or another method such as RFID. The trajectory and feedback device may also include a manual interface, such as a touch screen, that allows this information to be input.

After data entry and/or acquisition related to the club, device 126 may output a sound or provide an optical signal that indicates it has determined what club a player is using. Prior to beginning play, a player may have specified what brand of clubs in manner they are using and the feedback device may have determined properties of the clubs, such as mass, length, club loft from data stored with the analysis and feedback device or via remote communication with another device.

Next, the player may set a ball 110 on a tee (or simply approach the ball) and both cameras may identify the ball allowing the logic device to calculate the distance from the bag to the ball. The ball may be distinguished from other objects in the cameras field of view, such as various other course objects 112. When the ball is identified, a signal may be provided via an interface mechanism available to the player, such as an LED light on the bag changes from red to green signifying the device is ready for the player to hit the shot. As another example, a wearable device coupled to the player 122 may emit a visible and/or audible signal to indicate the player is ready to hit the shot.

After player hits the shot, cameras 124 or 125, may track the trajectory of the ball as it leaves the tee or its current position. The cameras may have wide-angle lenses that track the ball for 20 feet of the trajectory or more depending on a distance of the ball to the cameras and field of view of the camera. For a typical shot, at 200 frames/second the cameras may each capture the position of the ball in 19 frames: (20 ft/140 ml/hr×1 mile/5280 ft×60 min/1 hr×60 sec/1 min×200 fr/1 sec=19.4 frames). Of course, the number of frames captured may vary depending on the type of cameras employed and the physical parameters associated with the shot, which may vary from shot to shot and player to player.

The stereo camera may not only allow the speed and direction to be calculated in 2-dimensions, but also to calculate true speed and direction in 3-dimensions correcting for any misalignment from perpendicular in the placement of the bag. An advantage of stereo cameras may be that that it improves ball detection by the vision system by separating the ball from the clutter of colors and patterns in the background. In some embodiments, only a single camera may be used in other embodiments, an additional camera 118 (or sensor) aligned more or less in the direction of the shot may be used to capture a view of the ball in flight.

The arrangement, described above, may also be used to accurately calculate speed and direction of ball spin without materially changing the club or changing the ball or seeing the ball spin. In one embodiment, this can be accomplished by adding a grid marking to the head of the club facing the camera. The grid markings may be a sticker or a permanent marker template added at the factory during club manufacture. A high-speed camera may be able to measure twist of the club head (velocity and acceleration in multiple linear and rotational dimensions). For a particular player, a more accurate prediction of ball spin and direction may be possibly generated by going through a calibration procedure with an individual club that related specific player, specific club and specific swing with specific head twist (as measured by observing markings through the swing and contact with the ball) and specific ball acceleration result (as measured by camera in the first 20 feet of flight). Then, the measured variables may be related to the final position of ball landing (distance, roll, left and right trajectory and roll). For example, 20 swings with each club may provide a good look up table to give accurate ability to predict final ball result while only observing the club swing and the first 20 feet of ball flight.

In FIGS. 1, 2A and 2B, the example of an implementation of analysis and feedback device for use in golf and associated display interfaces are described for the purposes of clarity and understanding and are not meant to limit the scope of embodiments associated with the analysis and feedback devices described herein. For example, analysis and feedback device and/or system using interface devices other than a watch-like device may be utilized, such as an MP3 player, visor with a display screen, a speaker for audio feedback coupled to the golf bag, or a cell phone. Further, the analysis and feedback device may be provided as unit separate from a golf bag such that the analysis and feedback device may be provided that can be attached to or coupled to a non-custom golf bag or a golf cart. The separate unit may be designed or configured to be utilized while coupled to the golf bag or cart or separate from the golf bag or cart. In the case, where the unit is configured to be utilized while separate from the golf bag or golf cart it still may include attachments that allow it to be secured to these devices for transport purposes.

In FIGS. 2A and 2B, a watch-like interface device 122 with video display capabilities is described. As noted, other interface devices, such as cell phone or an MP3 player, may be utilized in conjunction with a provided interface device or as an independent interface device. Also, the analysis and feedback device may include an interface display. Further, it may be possible to provide output to a plurality of watches from a single analysis and feedback device. For example, player's playing in a group may each wear a device that is coupled to a single analysis and feedback device. Using the watches, the player's may receive and store information associated with their shots, receive feedback information regarding their shots as well as also view information about other player's shots if desired. Further, a feedback device may be coupled to multiple analysis and feedback devices, such that player's playing in different groups can share information.

FIG. 3 is an example of a wearable feedback interface for a trajectory detection and analysis system for golf. The wearable feedback device 122 may include a display 130 for providing visual information and/or a sound device 142 for providing audio information. One example of a visual interface screen is provided for the purposes of illustration only as other screen formats and types of information may be provided. The device 122 may be weather proofed, such as water-resistant or water proof.

In FIG. 3 on display 130, "dis" 132 refers to the calculated distance of the shot, which is shown as 240. "Clb," 134 refers to a calculated club head speed, based upon the captured frame data, which is shown as 140. "Act," 138, refers to calculated distance and club head speed that has just been measured for a particular shot. "Tar" refers to target calculated distance and club head speed for this particular player and this particular club that the player is trying to reproduce to build strong muscle memory. These numbers may be selected by the player and/or recommended by the feedback and analysis system taking in account player's physical attributes, such as height, weight, age, ability, past performance, etc. "Driver," 140, refers to the club identified by the device prior to the shot.

The wearable feedback device 122 may be operable to store environment, trajectory and club data which may be uploaded to a computer or other device, such as a device connected to the Internet. Also, the feedback and analysis device may include this capability. In one embodiment, the feedback device 122 may include a processor and integrated or removable memory, such as "flash memory," or a small hard drive. The device 122 may include a wireless and/or wired interface port, such as a port for a USB connection, that allows the device to be coupled to another device and possibly to receive power.

FIGS. 4 and 5 are examples of interface screens for a trajectory detection and analysis system for golf. These interface screens may be provided on a remote computer, such as a home computer, after a session, such as a round of golf or a trip to the driving range, where the feedback and analysis device is utilized. Further, interface screens of this type may be provide while the feedback and analysis device is being utilized, such as via a display screen coupled to the feedback and analysis device (e.g., see FIG. 7B).

As an example, a display 150 on the computer or Internet may appear as shown in FIG. 4. In FIG. 4, "swing skill" may be the analysis done on the data that is being presented. The large frame may display the trajectory of the last 10 shots color-coded for speed where a photo of player is in the background. "Swing Summary", "Swing Log" and "Noah Rankings" may be examples of other analyses/displays that are available and which the user may switch to using a suitable input device, such as a touch screen, mouse or keyboard. "Print Session" may allow a display page to be printed. "Driver" may identify the club associated with the data. The club analyzed may be player selectable. "10 swings" may identify the number of swings analyzed. The number of the swings analyzed as well as the session in which the swings were analyzed may be player selectable. "Target" may identify the personalized calculated distance or club head speed the golfer is trying to achieve.

"Min", "Max", "Average" may display the minimum, maximum and average calculated distance and club head speed for the 10 shots. Scale on the right hand side may identify the skill of the player's ability to reproduce the same calculated distance and club speed with every swing. Formula could be based upon a weighted average of the standard deviation of calculated distance and club speed. "Expert III" may indicate the current skill level for these 10 shots as displayed on the scale.

In another example, a display interface 160 may appear as shown in FIG. 5: "attribute", "club", "country", "state", "time period", "gender" and "age" may be selected from pull down menus. "ID" may be a self-identified name for use on the web. "Distance" may be an example of one trajectory parameter, in this case calculated distance, for the ranking reported in the identified categories.

At the range, a watch-like device or other real time display, such as shown in FIG. 3, may be the communication link among two or more golfers in one or more locations. Via a network, such as the Internet or other medium, the golfers may engage in a real-time competition using results from one or more analysis and feedback devices. Examples of real time games using unmodified clubs and balls may include, but are not limited to:

Greatest cumulative distance achieved in 1 minute. Device would calculate a normalized distance for each shot and would signal the start and stop of 1 minute. Device would then total distance of all shots within the minute and display score of all players.

Highest consistency skill for 25 shots with the same club. Device would display the skill level of all players when all have completed their 25 shot sessions.

Most consistent spacing for a series of clubs, for example 3 iron through 9 iron. Each player hits 1 shot with each of the seven clubs. Device calculates a normalized distance for each shot and the change in distance between each pair of clubs in the series (6 scores). Ranking could be done in a number of ways including standard deviation of the 6 pair differences. Players' scores are displayed.

Greatest cumulative height achieved in a minute. Device would calculate a normalized height for each shot and would signal the start and stop of a minute. Device would then total the heights of all shots within the minute and display score of all players.

Around the world game. Players need to hit the ball into 6 designated spots with a minimum of tries. Additionally, players who hit a designated spot could get an additional try in the same turn.

Knock out game. Players are given a particular distance to hit the ball. The last player to hit that distance is eliminated. The remaining players are given a new distance to hit the ball. Again, the last player to hit that distance is eliminated. Play continues until only one player, the winner, remains.

Horse. First player hits the ball a particular distance. All remaining players, in order, must hit the ball within 5 yards of that distance. The first player who does not hit the distance receives a letter H. The next player hits a shot of any distance. Again, all remaining players, in order, must hit the ball within 5 yards of that distance. The first player who does not hit the distance receives a letter. Play continues with each missed shot leading to an additional letter. Players who have 5 letters (spelling HORSE) are eliminated. Game ends when only one player, the winner, remains.

As described with respect to FIGS. 2A and 2B, trajectory information may be utilized as part of a video game simulation. In another game example, multiple analysis and feedback device may be used to allow a player to play a realistic game of golf with another player in a remote location. Trajectory information collected from the multiple devices may be integrated with course (fairway, rough, hazard, green) information, including satellite top-down views or pedestrian side views. This information may be stored on a remote device separate from the analysis and feedback device. Each player (number not limited to four) participating in the virtual golf game may be on the course, at a driving range or in a backyard. Calculated ball position outcome may be realistic enough to allow two players to play Pebble Beach on the real course and then at a later time play Pebble Beach in a virtual manner with the players at different locations, such as Player A in Cleveland and Player B in Chicago.

The real golf and the virtual golf may be accomplished with the same golf equipment, the same balls and a similar score outcome with each shot having the same landing position on the real course or the virtual course. Putting may be added with or without the benefit of a ball by watching the club swing (may require pre-calibration as described earlier). Sand traps may be added by allowing the player to hit the ball with a sand wedge off a mat or other surface, measuring the actual trajectory and then calculating the results of the sand shot using the pre-calibration to normalize for the effect of the sand trap material and slope. In one embodiment, Lining up the direction of the shot may take place in advance of the shot by positioning a laser line on the view of the virtual course. Then the calculated shot may be positioned on the virtual course based on how the actual swing and golf ball were struck. The system may allow communication connections that allow each of the players to see the results of their shots on the real or virtual course.

FIG. 6 is a block diagram of a trajectory detection and analysis system 100 for one embodiment. The components of the system 100 may be enclosed within a single housing or may be divided between a plurality of different housings enclosing different components of the system. Further, the system 100 may include different components that are not shown, such as the peripheral devices and remote servers.

Physical information 216 is input into the system 100 via sensors 212. In one embodiment, a machine vision system may be used where the machine vision system comprises one or more cameras 201 (e.g., a CCD camera) and a video capture card 203 for digitizing captured frame data. The video capture card 203 may capture color pixel data. The camera 201 may employ a 3.5-8 mm zoom lens and may allow for different lens attachments. In another embodiment, the system may employ a plurality of cameras arranged on a mechanism that allows different type cameras to be rotated or moved into place where only one camera is used at a time to record frame data. The different cameras may allow the detection volume of the system to be adjusted.

The digitized frame data from a machine vision system and other sensor data may be processed by a computer 202. The computer 202 may be a modified PC using a 1.6 GHz processor 204 w/RAM and a CD-RW drive 205 for inputting and outputting data and software. The computer 202 may also include a mass storage device, such as hard drive 207 and various network/device communication interfaces, such as wireless and wired network interfaces, for connecting to a local area network (LAN), wide-area network (WAN) or the Internet. The device communication interfaces may allow the computer to communicate with a plurality of peripheral devices and other remote system components.

The computer 202 may include operating system software 206 for controlling system resources, such as feedback interfaces 213 and the system input/output mechanisms 215. The computer 202 may be used to execute analysis software 208 for analyzing trajectories using the sensor data from sensors 212 and for generating feedback information 217. The analysis software 208 may include software for providing various services, such as 1) providing a list or a plot of trajectory session information comprising one or more of physical information, trajectory parameters and feedback information for the plurality of trajectories, 2) comparing the trajectory session information from the trajectory session with trajectory session information from one or more different trajectory sessions, 3) generating trajectory session parameters used to characterize a human's performance in the trajectory session, 4) predicting performance improvement as a function of the trajectory session parameters, 5) prescribing actions for improving performance and 6) performing video editing tasks. The computer 202 may also be used to execute database software for relating physical information 216 and other information generated by the computer 202 to player identification information (e.g., name, age, address, team, school, etc.) and session identification information (e.g., time, data, location, number of trajectories analyzed, types of shots, etc.).

Power to the computer 202 and other devices may be provided from the power supply 209. In one embodiment, the power supply 209 may be a re-chargeable battery or a fuel cell. The power supply 209 may include one or more power interfaces for receiving power from an external source, such as an AC outlet, and conditioning the power for use by the various system components. In one embodiment, for indoor/outdoor models, the system 100 may include photocells that are used to provide direct power and charge an internal battery.

Feedback information 217, used by clients of the system 100 to improve their trajectory skills, may be output through one or more feedback interface devices 213, such as a sound projection device 211. In general, the system may be capable of outputting feedback information 217 to a plurality of different devices simultaneously in a plurality of different formats, such as visual formats, auditory formats and kinetic formats.

The system 100 may support a plurality of different input/output mechanisms 215 that are used to input/display operational information 218 for the system 100. The operational information 218 may include calibration and configuration setting inputs for the system and system components. In one embodiment, a touch screen display 210 may be used to input and display operational information 218 using a plurality menus. Menus may be available for configuring and setting up the system 100, for allowing a player to sign into the system and to select preferred setting for the system 100 and for viewing session information 219 in various formats that have been generated by the system. The printer 214 may be used to output hard copies of the session information 219 for a player or other client of the system 100. The present invention is not limited to a touch screen display as an interface for operational information. Other input mechanisms, such as but not limited, a key board, a mouse, a touch pad, a joystick and a microphone w/voice recognition software may be used to input operation information 218 into the system.

FIGS. 6A-6C are perspective drawings of exemplary components of a trajectory detection and analysis system. The figure is provided to illustrate types of components in a trajectory system and not mean to limit various form factors and configurations of these components. For instance, the locations, sizes and form factors of these components could look substantially different if they were integrated into a golf bag. Further, every component of the system need not be included in every embodiment. For instance, the sound output device 211 may be eliminated in some designs or made substantially smaller, which could alter the form factor of the design.

In FIGS. 6A-6C, a camera 201 used in a machine vision system, a touch screen display 210, a computer 202 and a sound projection device 211 are integrated into a housing 300 with a support chassis 301. The system 100 may also include an amplifier for the speaker 211 (not shown).

Wheels 304 are attached to the chassis 301 to allow the system 100 to be easily moved and positioned for use. In general, the chassis of devices of the present invention may be designed with a weight and a form factor, which may facilitate transport, storage and unobtrusive set-up, calibration and operation of the device. For instance, the device includes a handle 303 attached to panels 300 comprising the housing that may be used to move the device and which may aid in set-up and storage of the device.

The speaker 211 takes up a large portion of the internal volume of the system. In one embodiment, a travel system may be used that incorporates a portable computer system such as laptop that is connected to a machine vision system with the camera 201. To use the travel system, it may be placed on top of a support platform, such as a tripod, a table, a chair or even coupled to a golf bag or golf cart. The travel system may provide feedback information via a wireless communication interface to audio device, such as an "earbud," worn by the player or wearable feed back device described with respect to FIG. 3. In another embodiment, the travel system may generate output signals that may be routed through a portable audio system (e.g., a boom box) for amplification via speakers on the audio system to provide feedback information.

FIG. 7 is an information flow diagram for a trajectory detection and analysis system of the present invention. A sensor system 502, which may comprise emitters 506 and detectors 506, receives physical information 507. The physical information 507 may be energy signals reflected from a tracked object 508, such as a golf ball. In the case where sensors are mounted to the tracked object 508, then the physical information 507 may be sent as signals from the sensors to a detector 504. Typically, the physical information 508 is transmitted through a medium such as air.

The sensor system 502 may convert the physical information 507 to sensor data signals 509. For instance, a charge-coupling device generates electronic signals in response to photons striking a sensor array. The sensor data signals 509 may be sent through a wired or wireless connection to a sensor interface 510, which provides signal conditioning. The signal conditioning may be needed to allow the sensor data 509 to be processed. For instance, prior to analysis, video frame data may be digitized by a video capture card.

In 513, the conditioned signals 511 may be processed according to system control software and according to trajectory analysis software 513 using set-up and control inputs 512 that have been input into the system. The system control software 513 may analyze portions of the data 511 to determine whether the sensor system 502 is operating properly. Based-upon the analysis of the data 511, the system control software may provide calibration instructions and other operational instructions to the sensor system which may be transmitted to the sensors via the sensor interface 510.

The trajectory analysis software 513 may be used to process the conditioned signals 511 and generate trajectory parameters. The trajectory parameters may be used to generate feedback information. The feedback information may be one or more trajectory parameters or a combination of trajectory parameters, such as a ratio of trajectory parameters or a product of trajectory parameters that may be useful to a system client in improving their trajectory skills.

Depending such factors as the application (trajectory of a specific type of object), the set-up and components of the system, the environment in which the system is used and what portion of the trajectory of an object the device is used to measure, the present invention may provide feedback to the player nearly immediately, within a second or within 10 seconds as measured from some time state along the trajectory that has been analyzed by the system. For instance, when information on the beginning of the trajectory is directly generated by the system, then the time to provide feedback may be measured from the time when the trajectory is initiated and then first detected by the system. When information on the end of the trajectory is directly measured, then the time to provide feedback may be measured from the time to when the trajectory has neared completion and has been detected by the system.

The feedback information may be sent as feedback information parameters 516 to one or more device interfaces 517. The device interfaces 517 may communicate with a plurality of feedback devices. The device interfaces 517, which may include device drivers, may transmit device data/commands 518 to a feedback device interface 519 located on each feedback device. The device data/commands 518 may be used to control the operation of the feedback devices. The output from the feedback device may also be modified using set-up/control inputs 520 that may vary for each device.

The feedback devices may output the feedback information parameters 516 received as device data 518 in one of an audio, visual or kinetic format 521 depending on the capabilities of the feedback device. For example, the device interface 517 may send device data/commands 518 to a display that allows a numeric value of a feedback information parameter 516 to be viewed on the display by one of the system clients 522, such as players, coaches and spectators. As another example, a device interface 517 may send device data/commands 518 to an audio output device that allows feedback information parameters 516 to be output in an audio format to one or more of the system clients 522.

The feedback parameters 516 generated from the trajectory analysis software 513 and other raw data generated from the sensor system 502 may be sent to session storage 515. The session storage 515 may accumulate trajectory data from a plurality of trajectories generated during a trajectory session for one or more players. All of a portion of the trajectory data 514 may be sent to archival storage 525 when the session has been completed. For example, only a portion of the raw data, such as video frame data, may be sent to archival storage. Further, the data may be filtered for bad data prior to being sent to archival storage 525. The archival storage 525 may include a database used to relate trajectory data from one or more trajectory sessions to the conditions of the trajectory session, such as time place and location, and player identification information.

The archival data 524 and session data 514 may be used to provide one or more services 523 including but not limited to 1) a session record of trajectory parameters (see FIG. 7), 2) session diagnostics, 3) prescription for improvement, 4) a history comparison of trajectory data from different sessions, 5) individual/group comparisons of trajectory session data, 6) video analysis and editing tools, 7) simulations (e.g., predicting a player's driving distance improvement based upon changing one or more of their swing parameters and 8) entertainment. As an example of entertainment, a player's trajectory average trajectory parameters and variability may be used in trajectory simulations for a video golf game or another game where the parameters have been measured. Two players that have used the system 100 may both enter their parameters and compete against one another in the video game. The player may also use the game to see how they match up against professional or other athletes who have had their trajectory parameters defined.

Output from the data services 523 may be converted to a portable record 527, such as print-out from a printer, or may be formatted for viewing on a graphical interface 528. The graphical interface may also include a storage capacity allowing data to be viewed at a later time. The output from the data services 523, such as a portable record 527 or information viewed on the graphical interface 528, may be used by the system clients 522. The data services 523 may also be provided via a data mining interface 526. The data mining interface 526 may include analysis tools and a graphical interface. When the archival storage is remotely accessible, it may be used to access archived data 524 via a remote connection, such as from the Internet.

Information passed between the different components in the system as described with respect to FIG. 6 may be transmitted using a number of different wired and wireless communication protocols. For instance, for wire communication, USB compatible, Firewire compatible and IEEE 1394 compatible hardware communication interfaces and communication protocols may be used. For wireless communication, hardware and software compatible with standards such as Bluetooth, IEEE 802.11a, IEEE 802.11b, IEEE 802.11x (e.g. other IEEE 802.11 standards such as IEEE 802.11c, IEEE 802.11d, IEEE 802.11e, etc.), IRDA, WiFi and HomeRF.

Calculating Golf Trajectory and Distance

The trajectory (flight) of a golf ball may be predicted based on an understanding of the dynamics of the club motion and the interaction of the club head with the ball, when contact occurs. Many parameters may be potentially significant: Club geometry (shaft length, weight, club head loft, and stiffness properties, to name a few), the speed and direction of the club head at the moment of contact, the angle of the shaft to the vertical at the moment of contact, the shape of the shaft due to flexing, and the location on the club head where the ball makes contact are some of the primary determinants of ball trajectory. These parameters can be measured either in advance (shaft length and club weight, for example), or in real time by the system (club head speed and direction, for example).

The interaction of the club head and the ball produces the motion of the ball. The ball motion at the instant it loses contact with the club head may be fully described by its position (x, y, z), velocity (Vx, Vy, Vz), and spin (Wx, Wy, Wz). This initial condition can be predicted by modeling the characteristics of the collision using the principles of Newtonian physics.

The speed of the club head approaching the ball can be decomposed into a component normal to the club head and a component tangential to it. For the moment, any club head motion lateral (sideways) to the club head is neglected as a second-order effect. The normal component of the speed determines the speed and direction of the ball, while the tangential component determines the spin (most often backspin). If the club head is much more massive than the ball, the ball speed is approximately double the club head normal speed. If this approximation is not valid, a more detailed analysis of the momentum transfer from the club to the ball is required, involving the relative weights of the two objects, the elasticity of the collision, and the energy contribution of the person swinging the club. This type of analysis may be utilized with the embodiments described herein.

The spin imparted to the ball by the club is the result of torque applied to the ball by the tangential speed of the club head. The torque is the result of frictional force during the time of contact, and the initial spin of the ball can be determined by calculating the impulse of angular momentum that this interaction generates. The angular momentum impulse is proportional to the square and cube of the club normal speed. Using empirical determination of the coefficients of the squared and cubed terms in this proportionality, a computation of initial ball spin can be performed in real time by measuring the club head speed. The component of spin about the lateral axis, representing topspin or backspin, typically has the most effect on the trajectory of the ball. The spin about the vertical axis, representing sidespin resulting in hooking or slicing motions is usually less important. Spin about the longitudinal axis, representing a type of rifling spin of a bullet, is considered insignificant, for this example, but may be included in a trajectory simulation.

Once the initial motion of the ball is known—position, velocity, and spin vectors—the trajectory of the ball can be calculated from its dynamics of flight and used to provide a player feedback information in real-time. The variation of the aerodynamic properties (lift, drag, and side force) with the ball's velocity and spin is a potentially significant effect that may be included as needed to achieve the desired level of accuracy in the performance parameters of interest.

An example of one methodology for calculating the trajectory of a golf ball is provided below for the purposes of illustration only. More or less complex simulations may be used and this example is not meant to be a limiting description of analysis and feedback devices described herein.

Equations of Motion

Figure 9:
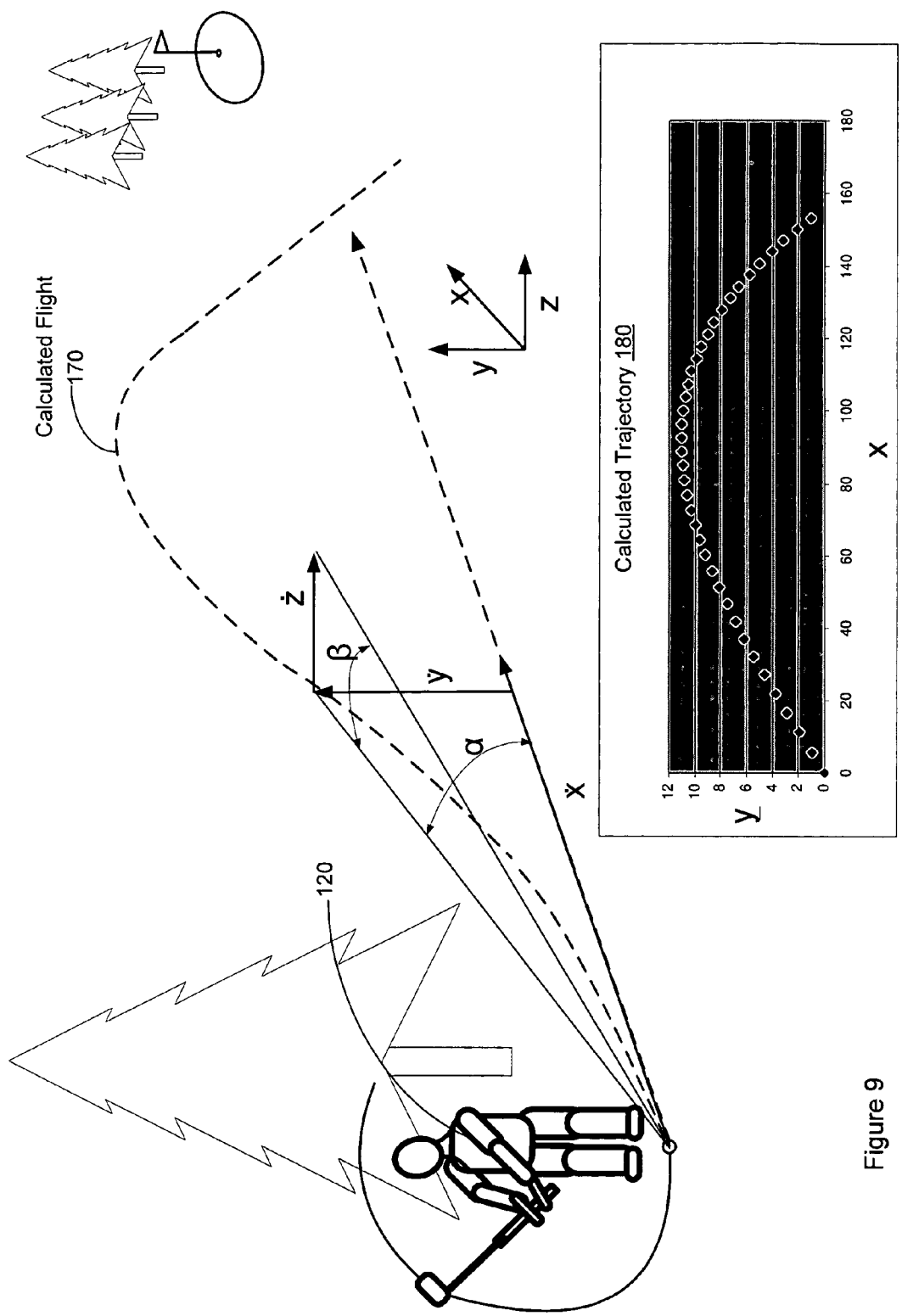
FIG. 9 is a diagram illustrating a coordinate system for an in-situ determination of a golf ball trajectory including a calculated trajectory distance.

The motion of a golf ball in flight may be described by the following equations.

$$\ddot{x} = -\frac{\rho s}{2m}[(\dot{x}+w_x)^2 + \dot{y}^2 + (\dot{z}+w_z)^2][C_D\cos\alpha\cos\beta + C_L\sin\alpha\cos\beta]$$

$$\ddot{y} = \frac{\rho s}{2m}[(\dot{x}+w_x)^2 + \dot{y}^2 + (\dot{z}+w_z)^2][C_L\cos\alpha\cos\beta - C_D\sin\alpha\cos\beta] - g$$

$$\ddot{z} = -\frac{\rho s}{2m}[(\dot{x}+w_x)^2 + \dot{y}^2 + (\dot{z}+w_z)^2][C_D\sin\beta + C_N\cos\alpha]$$

where the variables are defined as,
$\ddot{x}, \ddot{y}, \ddot{z}$ Acceleration components in x, y, z, direction
$\dot{x}, \dot{y}, \dot{z}$ Velocity components in x, y, z, direction
x Direction toward target
y Vertical
z To the right when facing target
$\rho$ Air density
s Cross-sectional area of ball
m Mass of ball
$w_x$, $w_z$ Wind velocity components
$C_D$ Drag coefficient
$C_L$ Lift coefficient
$C_N$ Side force coefficient
$\alpha$ Angle of flight above horizontal
$\beta$ Angle of flight to right of target
g Gravitational acceleration The coordinate system is shown with respect to FIG. 9. The equations of motion shown above may represent a system of coupled nonlinear ordinary differential equations, as such, no analytical, closed-form solution exists. With the computing power readily available in today's low cost personal computers, or even portable devices, such as cell phones, one practical approach to solving these equations may be to apply a numerical integration scheme. For example, it possible to perform an explicit time integration scheme using a small time increment, $\Delta t$, to advance the solution until the desired results are obtained. This example is provided for illustrative purposes only as many other types of numerical schemes may be employed with devices of the present disclosure.

The present method performs a numerical integration by using a spreadsheet computation to generate a database of the trajectory. The database contains all the relevant variables at each time step-acceleration, velocity position, flight angle, etc. A database query is then performed to extract the parameters of interest, such as but not limited to flight distance, maximum height, final speed, angle, etc.

The inputs to the trajectory computation are initial ball speed and flight angle and wind speed. The ball speed and flight angle may be deduced from the club speed and loft angle, and if desired as well as a calculation of the ball spin. The analysis and feedback devices described herein may be used to acquire these initial conditions.

For example, using a camera based system, capturing the position of the ball 5 or more times within the first 0.1 seconds of flight, or within the first 5 meters of flight, alternatively, allows the initial conditions for trajectory computation of a golf ball to be determined. The calculations are fast enough to allow immediate feedback to be provided to a user. For instance, the calculation described above may be performed in less than 1 sec. An example calculation is provided as follows.

As described above, the portion of the trajectory captured to determine the initial conditions for the ball as it leaves the club head may be about 5 meters along its flight path. The total distance of the shot along its flight path may be 10 meters or longer. The distance along its flight path is distinguished from the ground track of the shot, which may be much shorter than the distance along its flight path for a high arcing short. The devices described herein may be operable to predict trajectories for shots with ground tracks of various lengths (straight line distance from where the shot leaves the club to where it first hits the ground). For example, an initial portion of a trajectory of a shot with an actual ground track distance of 10 meters or longer, 20 meters or longer, 50 meters or longer, 100 meters or longer, 200 meters or longer may be captured with devices described herein and a prediction of the trajectory for the shot including a predicted ground track. In some embodiments, the device may be operable to determine an actual ground track for the shot including the location where it first impacts the ground, which may be compared with the predicted ground track of the shot including a predicted location where the shot first hits the ground.

The topography changes may or may not enter into the trajectory calculations. For instance, it may be assumed that the elevation of course is constant between where the shot is made to where it lands. In other embodiments, if an elevation map surrounding the shot is available, it may be possible to account for a change in elevation in predicting where the shot first lands. For example, a player may hit a shot from a higher elevation to a lower elevation which may result in a longer shot then if the ground is flat, which may be accounted for in the predictions of the trajectory devices described herein.

| Sample Trajectory Calculation | |
|---|---|
| Club loft angle, deg. | 10 |
| Initial speed, m/s | 57.9 |
| Headwind, m/s | 0 |
| Initial flight angle, deg. | 10 |
| Initial spin, rpm | 3500 |
| Time step, sec | 0.1 |
| Air density, kg/m^3 | 1.225 |
| $\pi$ | 3.141593 |
| Ball radius, m | 0.02055 |
| Drag area, $\pi$ * R2, m2 | 0.001327 |
| Ball mass, kg | 0.05 |
| CD | 0.25 |
| CL | 0.16 |
| Initial inclination, rad | 0.174533 |
| Initial x-velocity, m/s | 57.02037 |
| initial y-velocity, m/s | 10.05423 |
| Gravitational Acceleration, m/s | 9.8 |
| Initial horizontal velocity, m/s | 57.02037 |
| Initial vertical velocity, m/s | 10.05423 |
| Flight distance, m | 153.3384 |
| Max height, m | 11.02684 |
| Final speed, m/s | 32.11952 |
| Final angle, deg. | −20.4306 |
| Final horizontal velocity, m/s | 30.09907 |
| Final vertical velocity, m/s | −11.212 |

In the example above, as previously described, in one embodiment the initial conditions may be derived from data captured using an analysis and feedback device. In embodiment, the player may enter the loft of the club manually. In another embodiment, the device may store a database of club types and their characteristics. Thus, the player may simply enter the club set they are using and the club they used to make the shot and the device may be operable to look up the appropriate data associated with club. Similarly, the device may store a database of ball characteristics, such as coefficients of lift and drag. Thus, the player may enter the ball type they are using and the device may look up needed properties associated with the ball.

In addition, the analysis and feedback device may be operable to identify the club automatically that a player is using for a particular shot. For example, radio identification tags may be attached to the clubs that allow the device to determine what club is being used. In another embodiment, stickers or some other attachment may be provided to each club that may be uniquely identified by the vision system. In some embodiments, the device may allow a player to enter an estimated wind speed. In other embodiments, the device may have some wind measuring capabilities as well as other capabilities for determining ambient conditions that may affect a trajectory, such as temperature, humidity and air density (which may vary with altitude as well).

In FIG. 9, the calculated trajectory 180 shows x and y distances where y is a height above the ground. The maximum height that the ball reaches is approximately 11 meters and the shot travels approximately 153 meters. Although not shown, it may also be possible to estimate a roll of the shot after landing if desired by the player. For example, if the device has GPS detection, then when the player moves to the location of the ball for the next shot, the device may be operable to estimate the distance between shots based upon its lasts position, thus, the amount of roll may be estimated as the calculated distance of the trajectory relative to the actual position of the ball. In another example, the device may be able to estimate a roll distance based upon an angle that the ball hits the ground, its velocity at impact and conditions on the course, such as a hard or soft ground, etc. This information may be manually input by a player in one embodiment.

The analysis and feedback device may store the calculated trajectory results and the trajectory shown above may be displayed to the player. Also, as previously, feedback information, derived from the trajectory may be output to the player. The ground track of the ball, which may show, the amount of slice or draw may also be shown to the player. As another example, a trajectory of the ball may be output in a 3-D format including but not limited to one or more of simulated flight path in 3-D and a ground track of the ball. Many different aspects of the trajectory may be output and these are provided for illustrated purposes only.

In some embodiments, a quantification of some aspect of the flight of the golf ball derived from a predicted trajectory may be compared with a quantification derived from other means including more direct measurements or other prediction methods. For example, it may be possible for some shots to measure a distance from the analysis and feedback device to a final position of the golf ball or a position to where the golf ball first lands using an additional camera, a range finder coupled to the golf bag or some other direct measurement technique. In another example, a maximum height of a shot may be derivable from a sensor, such as a camera coupled to the feedback device. In yet another example, a player may use a range finder to determine the distance to their ball and then input the data into the analysis and feedback device.

When two techniques are available that provide a prediction or measurement of the same quantity, it may be possible to correct or adjust one or the other. For example, if it is possible to directly measure the height of a shot and to predict the height of a shot, then it may be possible to attribute differences between the trajectory prediction of the height of the shot and the measure height of the shot to a factor, such as wind speed, which may not be directly measurable. If it were possible to attribute the difference in heights to a factor, such as wind speed, then the trajectory prediction might be re-run with one or more variables adjusted, such as wind speed so that the trajectory prediction of the maximum height of the shot more closely matches the measure maximum height of the shot. This type of trajectory prediction adjustment may be performed when a quantity is both predicted using one means and then measured using a separate means.

In another embodiment, the analysis and feedback device may include a GPS device. As part of a calibration procedure, a player may play a few holes or a round of golf where predictions of a golf ball's trajectory are made. The device may record its position using a first GPS measurement at a location where the shot is hit, the player may then move the analysis and feedback device to the location where the golf ball landed as part of the preparation for the next shot and the analysis and feedback device may then record its position using a second GPS measurement. A distance derived from comparing the first GPS measurement and the second GPS measurement may be compared with a distance derived from a trajectory prediction. One or more factors that affect the trajectory prediction may then be adjusted so that the trajectory prediction and the GPS measurements more closely match. This process may be repeated over a number of shots to using data fitting techniques to provide a set of parameters for the trajectory prediction. The data may be fitted to choose a set of parameters that produce the best results over the range of shots considered.

In one embodiment, the analysis and feedback device may store data related to layouts of various golf courses or data from the analysis and feedback may be uploaded to a site that stores layouts of various golf courses. Using the layouts, a player may be able in practice, such as at a driving range, to play a simulated golf course of their choice. For instance, the device may provide a display showing a layout to the hole and possible club recommendations for each shot. After the player makes a shot that is analyzed by the device, the device may show the player's calculated position on the hole. Using this method, a player could see go through a round on a golf course during practice where the player could see how long it took them to reach the green for each hole playing a golf course of their choice. In another example, if a particular hole on a course that a player usually plays provides a challenge to the player could practice various shots they make when they play the hole, such as an initial shot and an approach shot where their progress could be charted.

In another embodiment, the analysis and feedback device may include a GPS location device that records the position of the player while they are playing on a golf course. Using the GPS data, a calculated trajectory and a layout of the course (e.g., a layout of the course may be obtained from a source such as Google Earth™), after a round a golf, a player may be able to view their round on a shot by shot basis as visual simulation progression through the course. The device or an associated device that has received data from the analysis and feedback device may be able to provide the player a 3-D simulation of their round from different perspectives, such as from a player's view after each shot or from a perspective that travels with the ball along the actual course layout. The 3-D simulation may display trajectory information that was previously recorded and any feedback information that was provided to the player during the round.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A device for analyzing a trajectory of a golf ball, the device comprising:
   one or more cameras for recording video frame data used to determine at least initial conditions for predicting a trajectory of a golf ball wherein only an initial portion of the golf ball's trajectory is captured in the video frame data for the purposes of predicting the trajectory and wherein the predicted trajectory comprises at least impact with a club to a location where the golf ball is predicted to land;
   a logic device designed or configured to i) receive the video frame data, ii) identify the golf ball in the video frame data, iii) predict the trajectory of the golf ball accounting for a spin of the golf ball wherein the trajectory predictions include generating trajectory parameters that characterize one or more states of the golf ball between at least the impact with the club and the location where the golf ball is predicted to land and iv) generate feedback information using the trajectory parameters; and
   at least one output mechanism for providing the feedback information wherein the device is portable and designed for use outdoors wherein the at least output mechanism includes a wireless interface for outputting the feedback information to one or more remote devices.

2. The device of claim 1, wherein the device includes two cameras.

3. The device of claim 1, wherein the device includes a stereoscopic camera.

4. The device of claim 1, wherein one or more portions of the device is water-resistance or waterproof.

5. The device of claim 1, wherein the device is integrated into a golf club bag.

6. The device of claim 1, further comprising: wheels.

7. The device of claim 1, wherein the logic device is further designed or configured to identify a body element of a person swinging the club.

8. The device of claim 7, wherein the logic device is further designed or configured to determine a position of the body element, an orientation of the body element, a velocity of the body element or combinations thereof, as a function of time and provide feedback information related to one or more of the position of the body element, the orientation of the body element or the velocity of the body element.

9. The device of claim 8, wherein logic device is further designed or configured to incorporate the position of the body element, the orientation of the body element, the velocity of the body element or combinations thereof, as the function of time into an animated model.

10. The device of claim 9, wherein the animated model is a 3-D skeletal model.

11. The device of claim 1, wherein the logic device is further designed or configured to identify the club in the video frame data.

12. The device of claim 11, wherein the logic device is further designed or configured to determine a position of the club, a velocity of at least one point on the club, an orientation of the club or combinations thereof as a function of time.

13. The device of claim 12, wherein the at least one point on the club is located on a club head or a clubface.

14. The device of claim 12, wherein the logic device is further designed or configured to incorporate the position of the club, the velocity of at least one point on the club, the orientation of the club or combinations thereof as the function of time into an animated model.

15. The device of claim 1, further comprising one or more sensors for determining an orientation of the device.

16. The device of claim 15, wherein the one or more sensors comprise accelerometers or tilt sensors.

17. The device of claim 1, wherein the remote device is worn by the player.

18. The device of claim 1, wherein the output mechanism is an audio device coupled to the display.

19. The device of claim 1, further comprising: a housing, for the one or more cameras, the logic device, and the at least one output mechanism, the housing having a weight and form factor which facilitate one or more of transport, storage, unobtrusive set-up, calibration, or operation of the device.

20. The device of claim 1, further comprising an input mechanism.

21. The device of claim 20, wherein the input mechanism is a touch screen display.

22. The device of claim 20, wherein the input mechanism is a wireless interface for receiving input from a remote device.

23. The device of claim 1, further comprising a GPS receiver.

24. The device of claim 1, wherein the logic device is a general purpose computer comprising: a processor, a data storage device, RAM, operating system software, device interfaces, device drivers and trajectory analysis software.

25. The device of claim 1, wherein the device is capable of one of autonomous set-up, autonomous calibration, autonomous operation or combinations thereof.

26. The device of claim 1, wherein after manual input of data by a user, a confirmation of data determined by the device, the logic device is further designed or configured to complete a calibration procedure.

27. The device of claim 1, further comprising:
   a memory storage device for storing trajectory session information wherein the trajectory session information comprises one or more of 1) digitized video frame data, trajectory information and feedback information generated for a plurality of trajectories, 2) a trajectory session time, 3) a trajectory session date, 4) a trajectory session location and combinations thereof.

28. The device of claim 1, wherein the device is designed to determine for a plurality of related trajectories captured by the device a consistency for at least one of the trajectory parameters generated for each of the plurality of related trajectories.

29. The device of claim 28, wherein the consistency is determined by calculating a statistical deviation.

30. The device of claim 1, wherein an actual distance the golf ball travels in a straight line along the ground from the impact with the club to the location where the golf ball actually lands is greater than 10 meters.

31. The device of claim 1, wherein an actual distance the golf ball travels in a straight line along the ground from the impact with the club to the location where the golf ball actually lands is greater than 50 meters.

32. The device of claim 1, wherein the device is for use on a golf course or on a driving range.

33. The device of claim 1, further comprising: a database of club characteristics for use in the trajectory predictions.

34. The device of claim 33, wherein the club characteristics include club geometry parameters, club material properties and club mass properties.

35. The device of claim 1, wherein the logic device is further designed or configured to predict a trajectory after the location where the golf ball is predicted to land.

36. The device of claim 35, wherein a final portion of the golf ball's trajectory includes a prediction of one or more bounces or rolls by the golf ball.

37. The device of claim 1, wherein logic device is further designed or configured to account for a change in elevation between a location where the golf ball is hit to the location to the golf ball is predicted to land in determining where the golf ball is predicted to land.

38. The device of claim 1, wherein feedback information is related to one or more of the following: 1) a predicted straight-line distance of the shot, 2) a measured straight-line distance of the shot based, 3) a predicted height of the shot, 4) a measured height of the shot, 5) a predicted landing speed of the shot, 6) the location where the shot is predicted to land, 7) a predicted direction vector of the shot, 8) a measured landing speed of the shot, 9) a measured landing location of the shot, 10) a measured direction vector of the shot, 11) a parameter quantifying trajectory consistency of a plurality of shots with an identical club, 12) a parameter quantifying trajectory spacing of a series of clubs, 13) a measured initial speed of the shot, 14) a measured initial angle of the shot, 15) a measured initial spin of the shot, 16) a measured initial direction vector of the shot, 17) a predicted time aloft, 18) a measured time aloft, 19) a predicted quantification of the amount of draw of the shot, 20) a measured quantification of the amount of the draw of the shot, 21) a predicted quantification of an amount of fade, 22) a measured quantification of an amount of fade, 23) a predicted distance traveled along trajectory of the golf ball, 24) a predicted distance traveled along the ground track of ball, 25) a predicted distance traveled along a line between the shot starting point and a another position, 26) a predicted initial distance from a pin prior to shot minus a final distance from the pin after the shot, 27) a measured initial distance from the pin prior to the shot minus the final distance from the pin after the shot, 28) a predicted distance accounting for a surface with which the golf ball makes contact including one or more of a fairway surface, a green surface, a rough surface, a water surface, a sand surface, a tree surface or combinations thereof, 29) a predicted club head speed at the impact with golf ball, 30) a measured club head speed at the impact with the golf ball, 31) a length of time of a backswing, 32) a length of time of a forward swing or 33) combinations thereof.

39. The device of claim 1, wherein the logic device is further designed or configured to store data related to one or the trajectory of the golf ball, movements of a person swinging the club, movements of the club captured in the video frame data for use in a video simulation related to golf.

40. The device of claim 39, a video simulation of the player is generated using the stored data.

41. The device of claim 1, where the logic device is further designed or configured to facilitate a game played between two or more persons separate from the play of a golf game.

42. The device of claim 1, wherein a first person of the two or more persons is remotely located relative to the device.

43. A device for analyzing a trajectory of a golf ball, the device comprising:

one or more cameras for recording video frame data used to determine at least initial conditions for predicting a trajectory of a golf ball wherein only an initial portion of the golf ball's trajectory is captured in the video frame data for the purposes of predicting the trajectory and wherein the predicted trajectory comprises at least impact with a club to a location where the golf ball is predicted to land;

a logic device designed or configured to i) receive the video frame data, ii) identify the golf ball in the video frame data, iii) predict the trajectory of the golf ball accounting for a spin of the golf ball wherein the trajectory predictions include generating trajectory parameters that characterize one or more states of the golf ball between at least the impact with the club and the location where the golf ball is predicted to land and iv) generate feedback information using the trajectory parameters for a person swinging the club; and at least one output mechanism for providing the feedback information to the person in real-time wherein the device is portable and designed for use outdoors and wherein the at least output mechanism includes a wireless interface for outputting the feedback information to one or more remote devices.

44. A device for analyzing a trajectory of a golf ball, the device comprising:

one or more cameras for recording video frame data used to determine at least initial conditions for predicting a trajectory of a golf ball wherein only an initial portion of the golf ball's trajectory is captured in the video frame data for the purposes of predicting the trajectory and wherein the predicted trajectory comprises at least impact with a club to a location where the golf ball is predicted to land;

a logic device designed or configured to i) receive the video frame data, ii) identify the golf ball in the video frame data, iii) predict the trajectory of the golf ball accounting for a spin of the golf ball wherein the trajectory predictions include generating trajectory parameters that characterize one or more states of the golf ball between at least the impact with the club and the location where the golf ball is predicted to land and iv) generate feedback information using the trajectory parameters for a person swinging the club; and at least one output mechanism for providing the feedback information to the person in real-time wherein the device is portable and designed for use outdoors wherein the one or more cameras, the logic device and the at least one output mechanism are integrated into a golf bag for carrying golf clubs and wherein the at least output mechanism includes a wireless interface for outputting the feedback information to one or more remote devices.

45. A device for analyzing a trajectory of a golf ball, the device comprising:

one or more cameras for recording video frame data used to determine at least initial conditions for predicting a trajectory of a golf ball wherein only an initial portion of the golf ball's trajectory is captured in the video frame data for the purposes of predicting the trajectory and wherein the predicted trajectory comprises at least impact with a club to a location where the golf ball is predicted to land;

a logic device designed or configured to i) receive the video frame data, ii) identify the golf ball in the video frame data, iii) predict the trajectory of the golf ball accounting for a spin of the golf ball wherein the trajectory predictions include generating trajectory parameters that characterize one or more states of the golf ball between at least the impact with the club and the location where the golf ball is predicted to land and iv) generate feedback information using the trajectory parameters;

at least one output mechanism for providing the feedback information wherein the device is portable and designed for use outdoors; and a housing, for the one or more cameras, the logic device, and the at least one output mechanism, the housing having a weight and form factor which facilitate one or more of transport, storage, unobtrusive set-up, calibration, or operation of the device.

46. A device for analyzing a trajectory of a golf ball, the device comprising:

one or more cameras for recording video frame data used to determine at least initial conditions for predicting a trajectory of a golf ball wherein only an initial portion of the golf ball's trajectory is captured in the video frame data for the purposes of predicting the trajectory and wherein the predicted trajectory comprises at least impact with a club to a location where the golf ball is predicted to land;

a logic device designed or configured to i) receive the video frame data, ii) identify the golf ball in the video frame data, iii) predict the trajectory of the golf ball accounting for a spin of the golf ball wherein the trajectory predictions include generating trajectory parameters that characterize one or more states of the golf ball between at least the impact with the club and the location where the golf ball is predicted to land and iv) generate feedback information using the trajectory parameters;

at least one output mechanism for providing the feedback information wherein the device is portable and designed for use outdoors; and input mechanism including a wireless interface for receiving input from a remote device.

47. A method in an electronic device including a processor and a memory for analyzing a trajectory of a golf ball wherein the electronic device is portable and designed for use outdoors, the method comprising:

receiving by the processor from one or more cameras video frame data used to determine at least initial conditions for predicting a trajectory of a golf ball wherein only an initial portion of the golf ball's trajectory is captured in the video frame data for the purposes of predicting the trajectory and wherein the predicted trajectory comprises at least impact with a club to a location where the golf ball is predicted to land;

identifying by the processor the golf ball in the video frame data, predicting by the processor the trajectory of the golf ball accounting for a spin of the golf ball wherein the trajectory predictions include generating trajectory parameters that characterize one or more states of the golf ball between at least the impact with the club and the location where the golf ball is predicted to land;

generating by the processor feedback information using the trajectory parameters; and outputting under control of the processor the feedback information using an output mechanism wherein the output mechanism includes a wireless interface for outputting the feedback information to one or more remote devices.

* * * * *